United States Patent Office 3,007,486
Patented Nov. 7, 1961

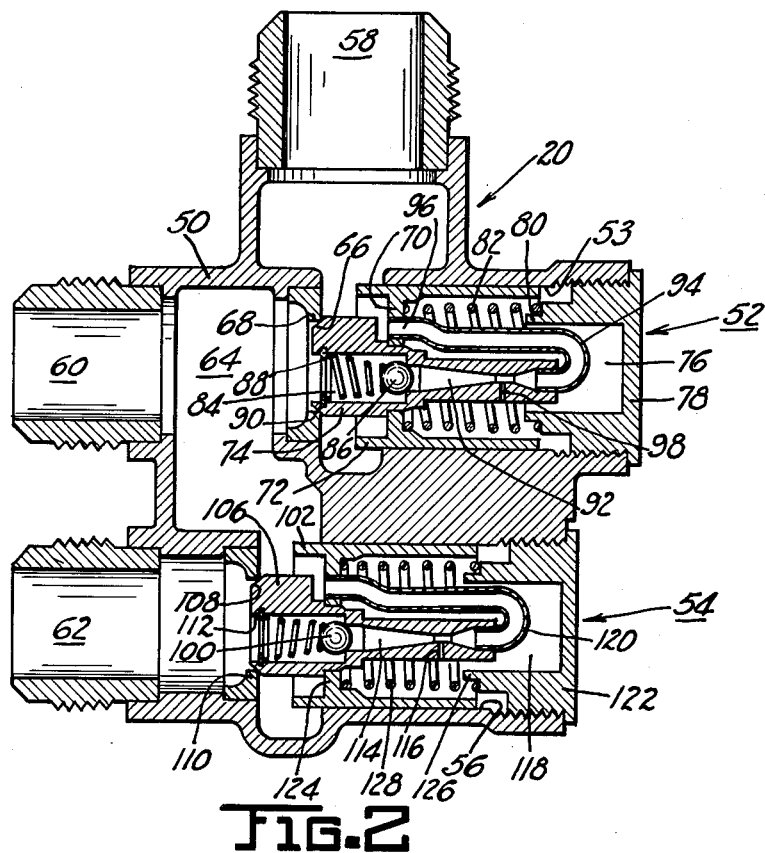

3,007,486
FLOW DIVIDER
Francis R. Rogers and Milton R. Adams, South Bend, Ind., assignors to The Bendix Corporation, a corporation of Delaware
Filed Dec. 24, 1958, Ser. No. 782,738
1 Claim. (Cl. 137—491)

This invention relates generally to fuel flow control systems for jet engines and more particularly to a flow divider for apportioning metering fuel between a plurality of fuel manifolds.

An object of the invention is to provide a flow divider capable of operation over a wide flow range while maintaining reasonable system pressures.

A further object of the invention is to provide a flow divider having valves held firmly against their seats just prior to opening and immediately after closure to prevent undesirable leakage to the fuel manifolds.

A still further object of the present invention is to provide a flow divider which apportions flow between a primary and secondary afterburner manifold as a function of inlet flow and manifold pressure.

A still further object of this invention is to provide fuel flow dividing and scheduling apparatus for jet engines which operates by means of pressure signals to schedule division of flow of fuel to primary and secondary afterburner flow manifolds.

Other objects and advantages of the present invention will become apparent from the accompanying drawings and the following description wherein:

FIGURE 2 is a cross sectional view of a flow divider in accordance with the present invention;

Figure 1:
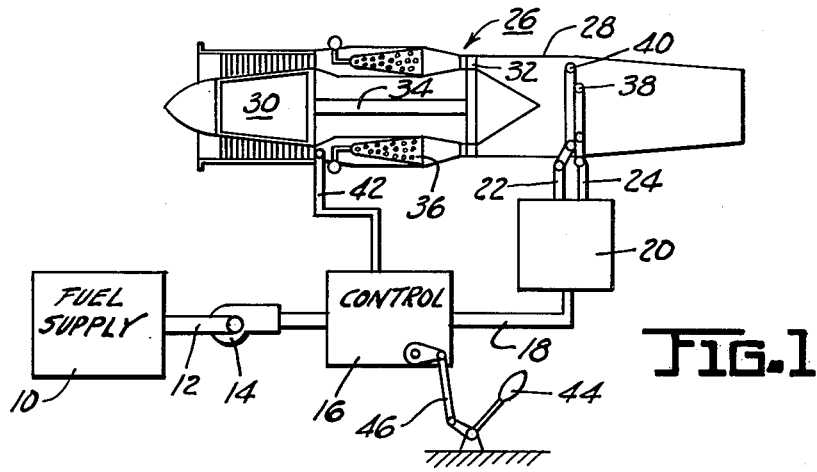
FIGURE 1 is a schematic diagram of a fuel control system in which the flow divider of this invention may be utilized.

Referring to FIGURE 1, this invention is utilized in a fuel flow control system comprising a source of fuel 10 having connected thereto a main fuel supply conduit 12 which contains an impositive displacement fuel supply pump 14, a fuel control 16 connected to the high pressure end of main fuel supply conduit 12 and further connected to metered fuel outlet conduit 18, and a flow divider 20 having two outlet conduits 22 and 24. A gas turbine engine generally indicated at 26 is operative with the previously described fuel supply system and includes an outer housing 28, a compressor 30, a gas driven turbine 32, a rotatable shaft 34 connecting said compressor to said turbine, a plurality of annularly disposed combustion chambers 36, and primary and secondary afterburner fuel flow manifolds 38 and 40 respectively. Fuel control 16 is operative to meter the fuel passing from main supply conduit 12 to the metered fuel outlet conduit 18 in response to compressor discharge pressure from the engine 26 transmitted through the conduit 42 and the position of throttle 44 as transmitted through the linkage system 46. The operation of fuel control 16 may be in accordance with copending application Serial No. 520,722, filed July 8, 1955, Howard J. Williams, inventor, and assigned to the same assignee as is the present application. Metered fuel from conduit 18 is received by the flow divider 20 and apportioned between the conduits 22 and 24 which are connected to the primary and secondary afterburner flow manifolds 38 and 40 contained in engine 26.

Referring to FIGURE 2, our flow divider 20 is shown in detail. Our flow divider control is comprised of a housing 50, a primary valve 52 slidably mounted in a cylindrical bore 53 of the housing 50, a secondary valve 54 also slidably mounted in a housing 50 in cylindrical bore 56. Flow divider 20 further includes openings 58, 60 and 62 which are connected to the conduits 18, 24 and 22 respectively, said latter named conduits being those identically numbered in FIGURE 1. The walls of housing 50 also form an interior chamber 64. The primary valve 52 includes a metering edge 66 at its extreme left end which is operative with valve seat 68 held by interior walls of housing 50 to control the communication between opening 58 and the interior chamber 64. In the position shown, metering edge 66 is in contact with the seat 68 thus preventing any flow into the interior chamber 64. A web element 70 connects an outer cylindrical element 72, which is slidable in the bore 53 of the housing 50, with an inner cylindrical element 74 which contains the metering edge 66. Outer cylindrical element 72 and web element 70 forms an interior chamber 76 which is further enclosed by the walls of housing 50 and the cap 78 threadedly secured to the housing 50. Cover 78 includes a circular projection 80 which is adaptable to seat one end of the spring 82 contained in chamber 76. Spring 82 further contacts web member 70 of a primary valve 52 to apply force to said valve member to urge it in a closing direction so that said valve is held in a closed position during shutdown conditions. Inner cylindrical member 74 contains a chamber 84 wherein is located a spring loaded ball check valve 86 maintained in position by the annular snap ring 88 which engages the groove 90 of the inner cylindrical element 74. A venturi 92 extends from the right of ball check valve 86 where it is connected to the conduit 94 which contains an open end 96 in communication with the fluid contained in opening 58. The small conduit 98 is connected to the throat section of venturi 92 on one end and to chamber 76 on the other. Secondary valve 54 is identical in all respects to the primary valve 52 with the exception of the closing force applied to spring loaded check valve 100, said secondary valve being comprised of a first outer cylindrical element 102 slidable in the bore 56 of the housing 50, inner cylindrical element 106 having a metering edge 108 operative with the valve seat 110 and an interior chamber 112 containing the spring loaded check valve 100, a venturi 114 having one end enclosed by the check valve 100 and a conduit 116 communicating the throat section of the venturi with chamber 118, and the conduit 120 connecting the other end of venturi 114 with the interior chamber 64. Cover 122 is threadedly secured in the housing 50 to enclose one end of the bore 56 to form the chamber 118 with the web 124 of the secondary valve 56 enclosing the other end. Cover 122 includes projection 126 for retaining one end of spring 128 the other end of said spring abutting against web element 124 to apply a closing force to said secondary valve.

Figure 3:
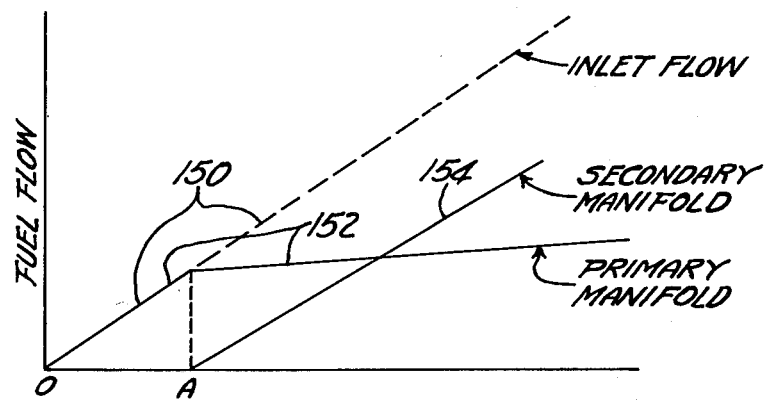
FIGURE 3 is a curve showing operating characteristics of a flow divider in accordance with the present invention.

The graph of FIGURE 3 includes a straight line curve 150 representative of the inlet flow being supplied by conduit 18 to our flow divider 20, a second curve 152 representative of the fuel flow being transmitted by conduit 24 to the primary manifold 38 of the engine 26, and curve 154 illustrating the flow from outlet conduit 22 to the secondary engine manifold 40. As illustrated by the curves, the entire amount of fuel flow being supplied by conduit 18 to the flow divider 20 from the point O to the point A, marked along the abscissa of FIGURE 3, is supplied to the primary fuel manifold 38. At the point A, our flow divider 20 is operative to begin supplying fuel to the secondary manifold 40 in accordance with the curve 154 while the fuel flow being supplied to the primary manifold 38 remains substantially constant for any inlet fuel flows in excess of that indicated at the point A. The slope of curves is determined by the back pressure characteristics of manifolds 38 and 40.

Figure 4:
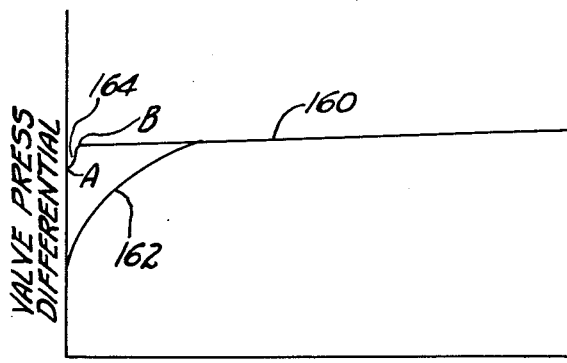
FIGURE 4 is another curve showing further operating characteristics of our flow divider.

The graph shown in FIGURE 4 shows further operating characteristics of either primary valve 52 or secondary valve 54 of FIGURE 2. The ordinate of the graph represents the pressure differential across either valve while the abscissa represents the fuel flow through the corresponding valve. The straight line curve 160, shown in FIGURE 4, illustrates that either of the aforementioned valves are operative to regulate a substantially constant pressure differential for varying fuel flows over the major portion of its operating range, once the particular valve is in regulation. In relatively simple prior art pressure relief valves, wherein a spring is used to urge the valve in a closing direction and the fluid pressure differential is operative to urge the valve in an opening direction, as the valve moves from a closed position to a position where it is in regulation, the pressure differential versus flow characteristic would be similar to that illustrated by the curve 162. This is because at the point of opening, the pressure differential acting on the valve would come very close to balancing out the spring force which holds the valve in a closing direction, thus allowing the valve to substantially float on its seat and to permit a fuel leakage. This leakage is highly disadvantageous in an afterburner installation, such as is shown in the present invention, as this flow would dribble from the afterburner flow manifold causing an undesirable engine operating characteristic. By employing the novel valve arrangement shown in the present invention, a positive valve holding force is obtained just prior to valve opening in order to obtain a minimum fuel leakage, to provide the valve opening characteristic shown by the curve 164.

*Operation*

The basic function of our flow divider is to divide the total flow into primary and secondary flow according to prescribed schedules. Accordingly, inlet flow is supplied by the conduit 18 to the opening 58 which is initially prevented from flowing into the inner chamber 64 by operation of the spring 82 which maintains the valve metering edge 66 in contact with the seat 68. Fuel flows into conduit 94 and venturi 92 where it is in communication with the ball check valve 86. Fluid is also transmitted into the chamber 76 through the conduit 98 connected to the throat section of venturi 92. This fluid in chamber 76 is operative to act on web element 70 and provide a closing force which maintains metering edge 66 in a closed position, and which exceeds the opening force due to fluid acting on web element 70 outside of chamber 76 because of the larger area of web element 70 exposed to fluid in chamber 76 than is exposed to fluid outside of said chamber. The force holding ball check valve 86 in a closed direction, derived from its associated spring, may be of any desired value to permit opening of check valve 86 at a predetermined pressure differential. For example, the force holding check valve 86 closed may be sufficient to maintain said valve in a closed position until a minimum pressure of 85 p.s.i.g. is obtained within venturi 92. As the pressure of fluid in opening 58 and chamber 76 approaches 85 p.s.i.g there will be a positive valve holding force holding metering edge 66 in a closed position due to the larger area of web element 70 exposed to the fluid in chamber 76 than is exposed to the fluid outside of said chamber. As the pressure of fluid in opening 58 exceeds 85 p.s.i.g. check valve 86 will move to the left and provide for the flow of fluid through venturi 92. Fluid flow through venturi 92 causes a pressure reduction at its throat section due to the increased fluid velocity at this point. Reduced pressure at the throat section of venturi 92 will cause a resultant pressure reduction of fluid in chamber 76 thus permitting the opening of metering edge 66. Fluid then flows from opening 58 through the opening provided by metering edge 66 and seat 68 and into the interior chamber 64 where said fluid is operative to flow out opening 60, conduit 24 and to the manifold 38 of engine 26, and is further operative to act on the secondary valve 54. Secondary valve 54 is operative identically to the primary valve 52 with the exception that the holding force or valve closing force applied to check valve 100 may be designed to be a second desired value. For example, the valve closing force applied to check valve 100 may be of a value sufficient to maintain said check valve in a closed position until a minimum of 33 p.s.i.g. pressure is attained across said valve. As the inlet fluid supplied by conduit 18 to the opening 58 continues to increase above the 85 p.s.i.g sufficient to open said valve, it will move check valve 86 in a further open position thus permitting more fluid flow through venturi 92 and further reduction of fluid pressure in chamber 76. The progressive lowering of fluid pressure in chamber 76 will further open the metering edge 66 permitting more fluid flow into the interior of chamber 64 and increasing the fluid pressure in chamber 64. As the pressure of fluid in chamber 64 increases, raising the pressure differential across check valve 100 of the secondary valve 54 to a value approaching 33 p.s.i.g, it will move from its seat thus lowering the pressure at the throat of venturi 114 and lowering the pressure in the chamber 118 permitting opening of metering edge 108. Fluid would then be supplied through opening 62 to conduit 22 and to the secondary manifold 40 of the engine 26 in accordance with the flow schedule illustrated by curve 154 of FIGURE 3. It should be understood, that the specific values of pressure differentials operative to actuate the primary valve 52 and secondary valve 54 are by way of example only, and that they may be readily varied without the exercise of invention to provide different closing forces for the check valves 86 and 100 for different opening and closing points for said valves.

Although the instant invention has been shown with a certain degree of particularity, it should be understood that the disclosed embodiment was made by way of example only and that various changes in the form and relative arrangement of parts may be made to suit individual requirements without departing from the scope and spirit of the invention.

We claim:

A flow divider comprising: a housing having a fluid inlet and primary and secondary fluid outlet conduits; first and second valves operative to control the flow of fluid from said inlet to said primary and secondary fluid outlet conduits respectively; first and second fluid pressure responsive pistons connected to said first and second valves respectively for controlling the fluid flow controlling positions of said valves; means supplying actuating fluid pressures to opposite sides of said first and second pistons, said pistons having a differential area such that the force due to the actuating fluid pressures urging said valves in a closed direction exceeds that force urging said valves in an open position; first and second venturi tubes having throat sections in communication with the actuating fluid pressures urging said first and second valves in closed positions respectively; and first and second check valves operative to prevent the flow of fluid through said first and second venturi tubes when in a closed position and permit flow therethrough when in an open position; said first check valve positionally responsive to the fluid pressure differential existing between said fluid inlet and said primary fluid outlet; said second check valve positionally responsive to the fluid pressure differential existing between said primary and secondary fluid outlet.

References Cited in the file of this patent

UNITED STATES PATENTS

| | | |
|---|---|---|
| 1,731,519 | Bastian | Oct. 15, 1929 |
| 2,005,445 | Wiedhofft | June 18, 1935 |
| 2,342,472 | Jurs | Feb. 22, 1944 |
| 2,890,714 | Greenwood | June 16, 1959 |